United States Patent
Wang

[19]

[11] Patent Number: 6,039,453
[45] Date of Patent: Mar. 21, 2000

[54] LIGHTED WATER GLOBE

[76] Inventor: Shiuh-Liang Wang, 815 N. First St., Alhambra, Calif. 91801

[21] Appl. No.: 09/018,503

[22] Filed: Feb. 4, 1998

[51] Int. Cl.⁷ ................................. F21V 3/00; F21V 8/00; F21V 31/00
[52] U.S. Cl. ........................... 362/101; 363/84; 363/363; 363/565; 363/567; 363/806
[58] Field of Search .................................... 362/363, 565, 362/567, 101, 84, 806, 809, 293, 122, 284, 324

[56] References Cited

U.S. PATENT DOCUMENTS

| | | | |
|---|---|---|---|
| 685,110 | 10/1901 | Crouch | 362/101 X |
| 1,681,040 | 8/1928 | Kemp | 362/101 X |
| 2,631,409 | 3/1953 | Windiate | 362/122 |
| 3,326,185 | 6/1967 | Perez | 362/101 |
| 3,609,343 | 9/1971 | Howlett | 362/256 X |
| 3,662,381 | 5/1972 | Steffens | 362/122 X |
| 3,749,901 | 7/1973 | Clough | 362/565 X |
| 3,803,398 | 4/1974 | Walker | 362/565 X |
| 4,747,022 | 5/1988 | Lin | 362/565 |
| 4,771,902 | 9/1988 | Teng | 362/101 |
| 5,067,059 | 11/1991 | Hwang | 362/101 |
| 5,211,469 | 5/1993 | Matthias et al. | 362/101 |
| 5,558,421 | 9/1996 | Guastella | 362/565 |
| 5,865,533 | 2/1999 | Liu | 362/565 X |

Primary Examiner—Laura K. Tso
Attorney, Agent, or Firm—Ladas & Parry

[57] ABSTRACT

A lighted water globe comprises a base having a hollowed interior and a water filled glass dome arrangement supported on the base. The glass dome arrangement has a lower portion accessible within the base interior and the lower portion has a window through which light may pass. A bundle of fiber optic elements is disposed within the glass dome arrangement, the fiber optic elements terminating at an end of the bundle adjacent the window. A light source is disposed in the base interior directing light to the bundle end through the window. A music box movement provides mechanical power to rotate an effects wheel to dynamically alter the light as it passes from the light source to the window and on to the bundle end of the fiber optic elements, creating interesting and changing lighting effects. The internal objects within the water globe may be made from a material which glows in the dark.

18 Claims, 3 Drawing Sheets

LIGHTED WATER GLOBE

BACKGROUND OF THE INVENTION

1. Field of the Invention

This invention relates to lighted water globes, and in particular to a lighted water globe that displays unique lighting characteristics.

2. Brief Description of the Prior Art

Conventional lighted water globes have a light source mounted in a base below the glass dome. The light source is a light bulb which illuminates objects in the globe. The visual effect is mildly interesting but not exciting, and the lighted globe becomes boring ornamentally due to the broad or even distribution of light within the globe, and due to the constant visual effect it offers.

SUMMARY OF THE INVENTION

One aspect of the present invention offers an improvement over simple lighted water globes of the prior art by providing a fiber optic lighting effect for objects within the water filled dome of the water globe arrangement.

In another aspect of the invention, a light altering element, such as a rotating visual effects wheel, is provided between a light source in the base and the internal objects of the water globe arrangement to offer unique dynamic visual effects, such as continuous color changes, blinking light effects, fading light effects, moving light effects, etc.

In yet another aspect of the invention, there is provided a music box movement in combination with the aforementioned visual effects wheel, the music box providing the mechanical power to rotate an effects wheel.

In a further aspect of the invention, the internal objects within the water globe are made from, or coated with, materials which glow in the dark. Such objects include flowers, flower arrangements, animal figures, human figures, other nature figures, building structures, automobiles, airplanes, boats, or any other object which would be visually interesting to an observer.

In accordance with the present invention, there is provided a lighted water globe comprising a base having a hollowed interior, and a water filled glass dome arrangement supported on the base. The glass dome arrangement has a lower portion accessible within the base interior and through which light may pass. A bundle of fiber optic elements is disposed within the glass dome arrangement, the fiber optic elements terminating at an end of the bundle adjacent the lower portion. A light source is disposed in the base interior directing light to the bundle end through the lower portion.

In a preferred embodiment, a powered actuator is mounted in the base interior, and a light altering element having a plurality of light altering segments is dynamically manipulated to place different ones of the light altering elements in the path of the light directed to the bundle end from the light source.

The lighted water globe may comprise a music box movement mounted in the base interior, wherein the powered actuator described in the preceding paragraph is a shaft of the music box movement.

The light altering element is preferably in the shape of an effects wheel rotatable by the powered actuator, the wheel having angularly spaced ones of the light altering elements thereon.

BRIEF DESCRIPTION OF THE DRAWING

These and other aspects of the invention will be better understood, and additional features of the invention will be described hereinafter having reference to the accompanying drawings in which.

DETAILED DESCRIPTION OF THE PREFERRED EMBODIMENTS

Figure 1:
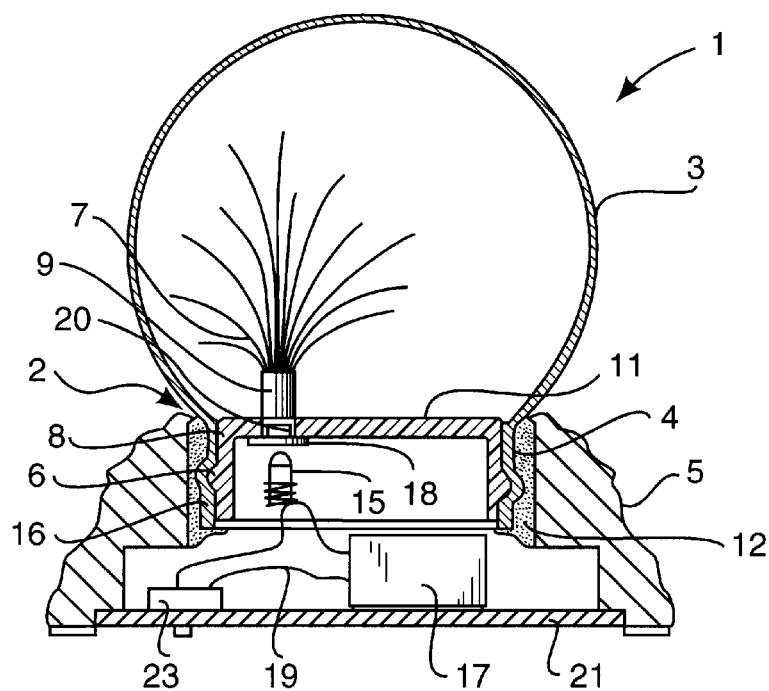
FIG. 1 is a cross sectional view of a water globe showing a simplified embodiment of the invention employing the components necessary to display fiber optic lighting effects.

FIG. 1 shows lighted water globe 1 comprising a globe base 5 supporting a glass dome 3 within which fiber optic strands 7 are disposed for visual display through the glass dome 3. The fiber optic strands 7 are bundled tightly together at their base and wrapped tightly by a plastic sheeting or collar 9. The bottom ends of fiber optic strands 7 may be glued together within collar 9 for security purposes. The glass dome 3 is sealed by a flexible sealing member, e.g. a rubber plug 11.

The base 5 of water globe 1 has an upper mouth 2 for receiving the bottom 4 of the glass dome 3.

The flexible sealing member 11, preferably a rubber plug, has an annular side wall 8 fitted and adhered around the inner surface of the bottom 4 of glass dome 3. In addition, the plug annular side wall 8 and the bottom 4 of the glass dome 3, respectively, have rubber plug annular projection 6 and glass dome annular projection 16 to mutually engage in a secure air and water tight seal to prevent water in the glass dome 3 from leaking out. To secure the glass dome 3 in base 5, adhesive, or glue, 12 is applied between the bottom portion 4 of glass dome 3 and the inner surface of the upper mouth 2 of base 5.

Rubber plug 11 has a hole 20 formed therein to permit light to communicate from below plug 5 to objects within glass dome 3, such as the fiber optic strand bundle 7. A lamp 15 is positioned directly beneath the hole 20, and the collar 9 is fixed above the hole 20, thereby permitting light from lamp 15 to pass through hole 20 and illuminate the fiber optic bundle end of the fiber optic strands 7.

In FIG. 1, it will be observed that the strands of fibers 7 are aligned together at the bottom end, and after being wrapped and glued into place in collar 9, the bottom end of collar 9 is cut to provide a flat, even bottom surface which can be seated into a preformed opening, or slot, 22 in a poly-resin foundation 10 (FIG. 2) that has been molded to appear like a plot of soil with rock and plant formations.

A plastic, acrylic, or glass divider (light diffuser) 18 is glued to the periphery of the hole 20 in rubber plug 11, and the collar 9 is glued to the periphery of the preformed slot 22 in the foundation 10, the surfaced flat bottom of collar 9 being placed directly against the top of divider 18 which also has a flat surface on its upper end.

The light from lamp 15 is directed through the divider 18 and up through the fiber optic strand bundle 7 to provide the unique fiber optic effect.

A battery 17 is mounted in the base 5, and an on/off switch 23 is accessible through base cover 21. Appropriate wiring 19 carries current from battery 17 through switch 23 and through lamp 15 in a standard on/off switching arrangement.

Figure 2:
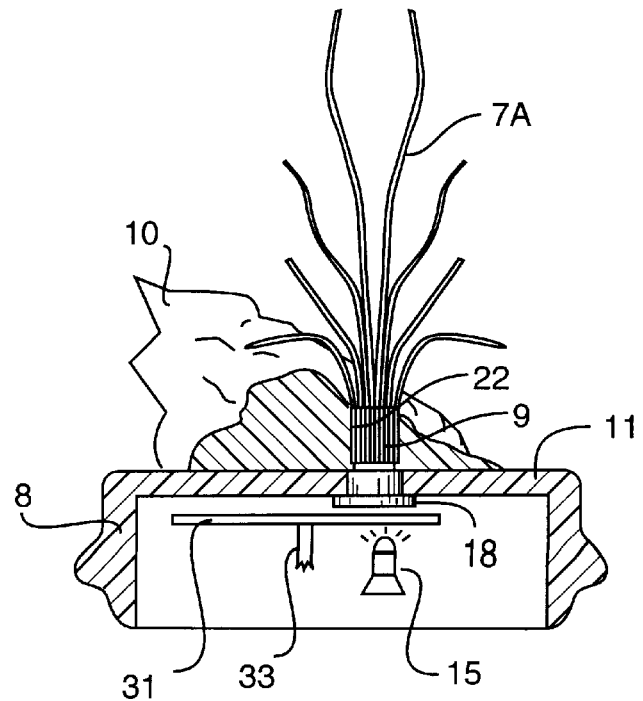
FIG. 2 is a schematic representation of the major elements of the invention for creating a dynamic fiber optic lighting effect.
Figure 3:
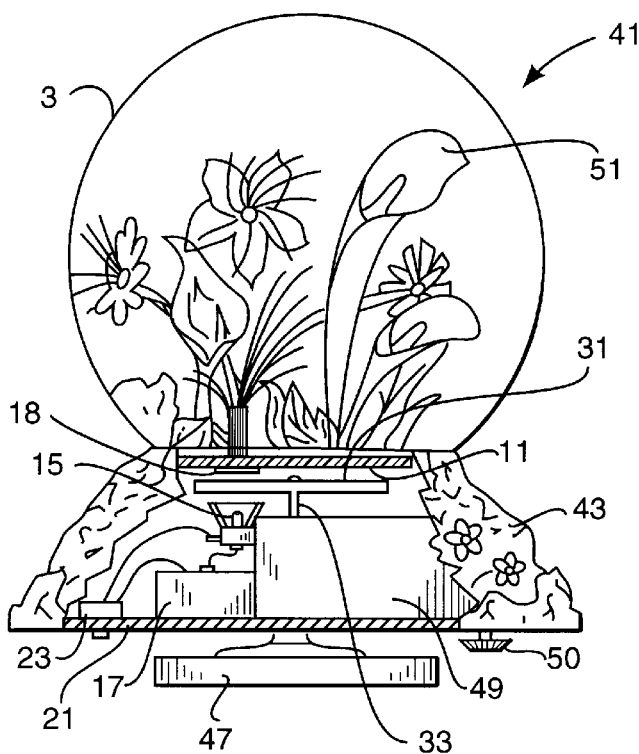
FIG. 3 is a partial cross sectional side view of the invention showing the components in the base portion and lighted objects in the dome portion for a full featured embodiment.
Figure 5:
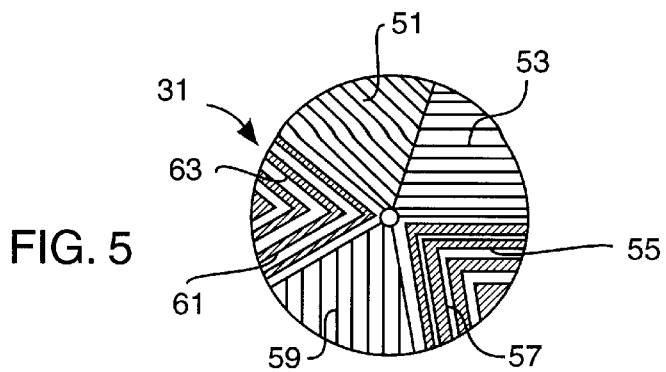
FIG. 5 is a top plan view of a rotatable light effects, i.e., light altering, wheel for creating dynamic lighting effects for the lighted water globe.

As can best be seen by reference to FIGS. 2, 3, and 5, additional lighting effects are realized by the placement of an effects wheel 31 rotated on a shaft 33, the effects wheel being placed between the light source 15 and the divider 18 to cause a periodic change of colors and/or light intensity, for example.

In a preferred embodiment of the invention, the shaft 33 is provided by a music box movement 49. The shaft 33 of music box movement 49 passes through the base cover 21 to a support stand 47. In this arrangement, as the music box movement plays a tune, shaft 33 rotates to cause the entire lighted water globe 41 to revolve relative to support stand 47, and at the same time shaft 33 rotates the effects wheel 31 to place different segments of wheel 31 in the light path between the lamp 15 and divider 18. If desired, the support stand 47 may be affixed to base 43, such that only the effects wheel 31 rotates as the musical tune is played.

The revolving musical movement 49 has a winding key located under the bottom of the water globe base 43, which base is sculptured to match the theme of the objects disposed in the glass dome 3. The upper output shaft 33 of the musical movement 49 is fixed, as by a screw or nut for example, to the center of effects wheel 31.

The revolving musical movement 49 may be selected from a variety of available types, such as musical movement No. 37101 available from the Woodworkers' Store, 4365 Willow Drive, Medina, Minn. 55304.

Since musical movements of this type are well-known in the art, details of their operation are unnecessary in this description.

In an alternative embodiment of the invention, the objects within the glass dome 3 may be made of a fluorescent material, or may be coated with a fluorescent material. For example, all of the simulated botanical items 51 in the floral grouping within the glass dome 3 of FIG. 3 may be coated with a fluorescent material, and the ground or rock formations may be similarly treated for a shine-in-the-dark effect. Thus, either from outside lighting, or from the internal lighting supplied by lamp 15, after switch 23 is put to its off position, the user may still derive pleasure from the fluorescing objects within the glass dome 3.

Figure 4:
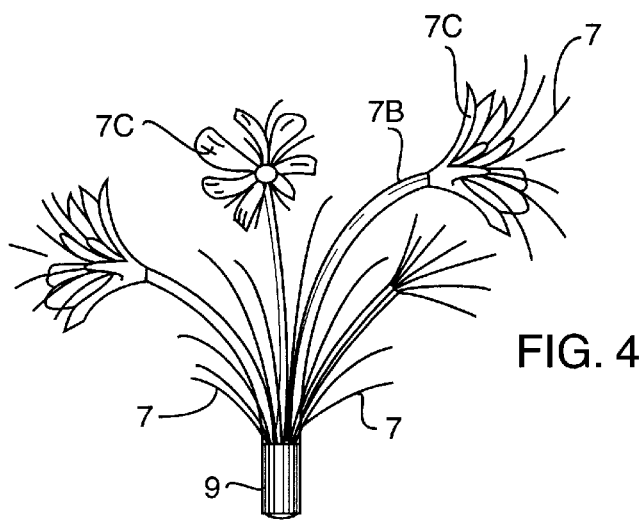
FIG. 4 is a perspective view of a typical fiber optic flower arrangement representing an example of lighted objects within the glass dome of the water globe.

In addition to, or alternative to, the arched fiber optic strands 7 shown in FIG. 1, a set of formed fiber optic strands 7A as seen in FIG. 2 may provide a more interesting and more realistic plant-like character. As seen in FIG. 4, a group of fiber optic strands 7 may be bundled together, for example within a transparent plastic tubular member, to form the stem 7B of a flower. Both the fiber optic strands 7 exiting the bloom 7C of such an arrangement, as well as the bloom portion 7C, are lighted by lamp 15 providing an interesting and beautiful glowing floral display within the lighted water globe.

FIG. 5 shows the details of a rotatable effects wheel 31. The wheel is divided into five segments, each offering a particular visual effect on the fiber optic strands 7 as the wheel, or disc, 31 rotates.

Segment 51, for example, is lined for the color green, while segment 53 is lined for the color blue, and segment 59 is lined for the color red. Thus, as the wheel 31 rotates, the fiber optic strands 7 dynamically change from a green color to a blue color and eventually to a red color in a continuing cycle.

The two segments between the colored segments in wheel 31 as shown in FIG. 5 are constructed to have alternating opaque and transparent areas. In the example shown in FIG. 5, a series of V-shaped stripes 55, 57, 61, 63 are provided. As the wheel 31 turns, different fiber optic strands 7 receive light through the transparent regions between the stripes at different times, giving the visual effect that the fiber optic strands 7 are blinking on and off and/or that they are sequentially energized so as to appear that the light is moving across the bundle of fiber optic strands 7. For example, as effects wheel 31 in FIG. 5 rotates clockwise, light passing through the transparent areas between opaque stripes 57 would appear to travel across the distal ends of the bundle of fiber optic strands 7 at a particular angle as the stripes 57 pass between the lamp 15 and the collar 9. The light would appear to turn angularly as it travels across the bundle of fiber optic strands 7 and the stripes 55 pass between the lamp 15 and the collar 9. With the distal ends of the fiber optic strands 7 spread out as shown in FIG. 1, however, a rather random moving/blinking light effect is observed.

Of course, any number of patterns of opaque and transparent combinations, colors, blends, fading, etc. are possible with only minimal change in the artwork on the effects wheel 31.

It is to be understood that the use of a musical movement 49 and a rotatable disc-shaped wheel 31 are only examples of means for dynamically directing different light images, colors, or patterns onto the bundled end of the fiber optic strands 7. For example, a belt-like member may be placed around a pair of spaced rollers (not shown) with the lamp 15 placed between the rollers, and different lighting effects may be achieved by constructing the belt having different segments passing in the light path as the belt turns about the rollers. Accordingly, the invention is not limited to the specific actuating means and effects wheel 31 as shown and described herein. Any small powered actuator mounted in the base interior of the lighted water globe, and any light altering element which has a plurality of light altering segments, powered by the actuator, for dynamically placing different ones of the light altering elements in the path of the light directed to the bundle end of the fiber optic strands 7 may be selected to implement the invention.

Figure 6:
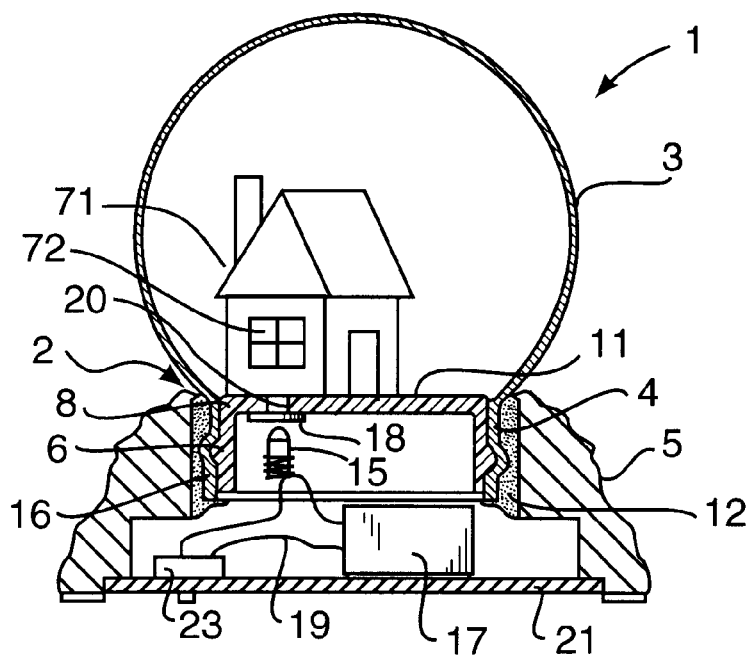
FIG. 6 is a perspective view of a further embodiment of the invention showing a structure as the object through which light is channeled and diffused.
Figure 7:
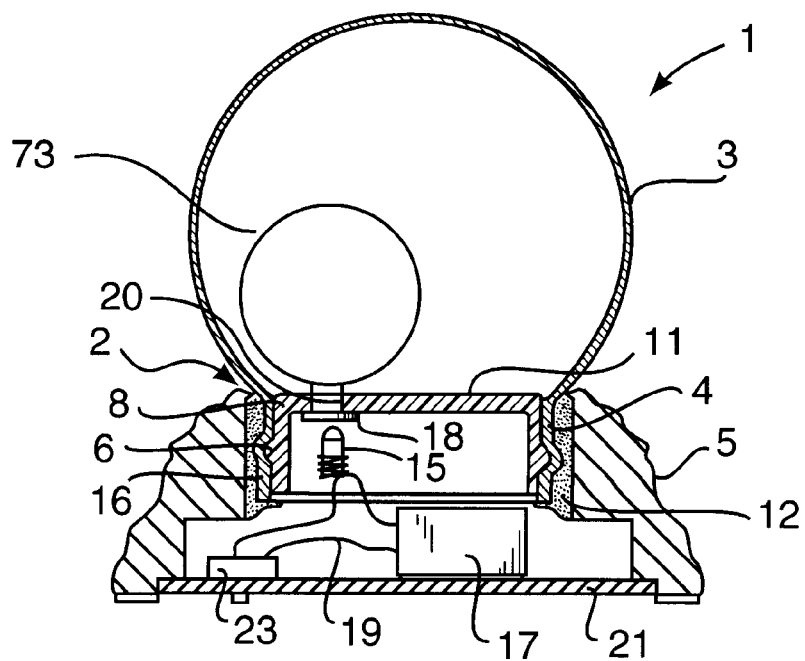
FIG. 7 is a perspective view of a further embodiment of the invention showing a sphere through which light is channeled and diffused.

Alternative embodiments of the invention are illustrated in FIGS. 6 and 7. As depicted in FIG. 6, a replica of a cottage, house or some other structure 71 can be disposed over divider 18. Light channeled through divider 18 and into structure 71 can be diffused through openings in structure such as windows 72. In FIG. 7, a spherically shaped object 73 is shown disposed over divider 18. The spherical object 73 can be clear or tinted opaque in various colors. It too diffuses light channeled into it through divider 18. These are merely examples of different means to capture and diffuse light channeled through divider 18 and it is understood that the invention is not limited to the specific examples mentioned.

Accordingly, while only certain embodiments of the invention have been set forth above, alternative embodiments and various modifications will be apparent from the above description and the accompanying drawing to those skilled in the art. These and other alternatives are considered equivalents and within the spirit and scope of the present invention.

What is claimed is:

1. A lighted water globe comprising:

a base having a hollowed interior;

a water filled sealed glass dome arrangement supported on said base, said glass dome arrangement comprising a glass dome having an open lower extension and a flexible rubber sealing member closing said open lower extension, said flexible rubber sealing member having a hole formed therein, said hole defining a light transmissive window through which light may pass;

a bundle of fiber optic elements disposed within said glass dome arrangement, said fiber optic elements terminating at an end of said bundle adjacent said light transmissive window; and a light source disposed in said base interior directing light to said bundle end through said light transmissive window.

2. The lighted water globe as claimed in claim 1, comprising:

a powered actuator mounted in said base interior; and a light altering element having a plurality of light altering segments, said powered actuator coupled to said light altering element for dynamically placing different ones of said light altering elements in the path of the light directed to the bundle end from said light source through said light transmissive window.

3. The lighted water globe as claimed in claim 2, comprising a music box mechanism mounted in said base interior, and wherein said powered actuator is a shaft of said music box mechanism.

4. The lighted water globe as claimed in claim 2, wherein said light altering element is a wheel rotatable by said powered actuator, said wheel having angularly spaced ones of said light altering elements thereon.

5. The lighted water globe as claimed in claim 4, wherein said light altering elements include colored segments of said wheel.

6. The lighted water globe as claimed in claim 4, wherein said light altering elements include striped segments of said wheel arranged to alternately illuminate parts of said fiber optic bundle end to create a blinking light effect.

7. The lighted water globe as claimed in claim 4, wherein said light altering elements include striped segments of said wheel arranged to illuminate progressive parts of said fiber optic bundle end to create a moving light effect.

8. The lighted water globe as claimed in claim 1, comprising fluorescent objects within said glass dome.

9. The lighted water globe as claimed in claim 1, comprising a light diffuser between said light source and said fiber optic bundle end for distributing light to said fiber optic bundle end in a predetermined pattern.

10. The lighted water globe as claimed in claim 1, comprising a molded foundation within said glass dome supporting objects of interest within said glass dome, said molded foundation having an opening therein into which said fiber optic bundle is inserted for placement of said fiber optic end in alignment with said light transmissive window to intercept light from said light source.

11. A lighted water globe comprising:

a base having a hollowed interior;

a water filled glass dome arrangement supported on said base, said glass dome arrangement having a lower portion accessible within said base interior and through which light may pass;

a bundle of fiber optic elements disposed within said glass dome arrangement; said fiber optic elements terminating at an end of said bundle adjacent said lower portion;

a light source disposed in said base interior directing light to said bundle end through said lower portion;

a powered actuator mounted in said base interior;

a light altering element having a plurality of light altering segments, said powered actuator coupled to said light altering element for dynamically placing different ones of said light altering elements in the path of the light directed to the bundle end from said light source;

a music box movement mounted in said base interior, said powered actuator being a shaft of said music box movement; and a support stand for supporting said lighted water globe above a surface upon which said support stand is placed, said music box mechanism coupled to said support stand, whereby actuation of said music box mechanism rotates said base and glass dome, and their internal components, relative to said support stand.

12. A lighted water globe comprising:

a base having a hollowed interior;

a water filled sealed glass dome arrangement supported on said base, said glass dome arrangement comprising a glass dome having an open lower extension and a flexible rubber sealing member closing said open lower extension, said flexible rubber sealing member having a hole formed therein, said hole defining a light transmissive window through which light may pass;

an object disposed within said glass dome arrangement, said object disposed adjacent to said light transmissive window;

and a light source disposed in said base interior directly beneath said light transmissive window, directing light to said object through said light transmissive window.

13. The lighted water globe as claimed in claim 12, wherein said object is a replica of a structure, said structure having a transparent opening adjacent said window, through which said light is diffused after passing through said window.

14. The lighted water globe as claimed in claim 12 wherein said object is spherically shaped and is translucent through which said object light is diffused.

15. The lighted water globe as claimed in claim 1, comprising a light diffuser covering said light transmissive window on the bottom of said flexible rubber sealing member, said end of said bundle being placed through said light transmissive window and directly against the top of said divider.

16. The lighted water globe as claimed in claim 12, comprising a light diffuser covering said light transmissive window on the bottom of said flexible rubber sealing member.

17. A lighted water globe comprising:

a base having a hollowed interior;

a water filled sealed glass dome arrangement supported on said base, said glass dome arrangement comprising a glass dome having an open lower extension and a flexible rubber sealing member closing said open lower extension, said flexible rubber sealing member having a hole formed therein, said hole defining a light transmissive window through which light may pass;

a light diffuser covering said light transmissive window;

an object disposed within said glass dome arrangement, said object disposed adjacent to said light transmissive window;

and a light source disposed in said base interior directing light to said object through said light transmissive window.

18. The lighted water globe as claimed in claim 1, comprising fluorescent coated objects within said glass dome.

* * * * *